Figure 5:
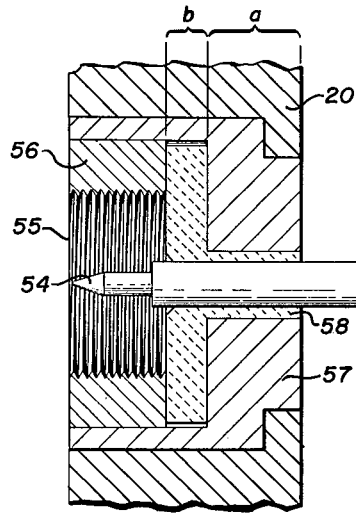

Nov. 27, 1962    R. M. WHITEHORN    3,066,290
WAVEGUIDE HYBRID JUNCTIONS
Filed Dec. 28, 1959    2 Sheets-Sheet 1
Fig. 2
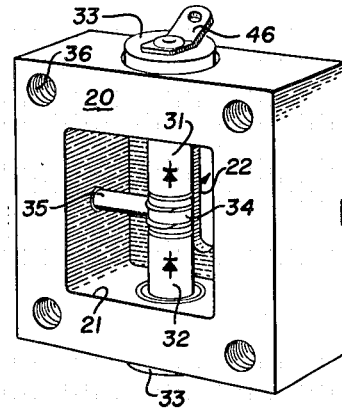
Fig. 3
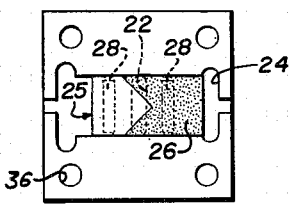
Fig. 7
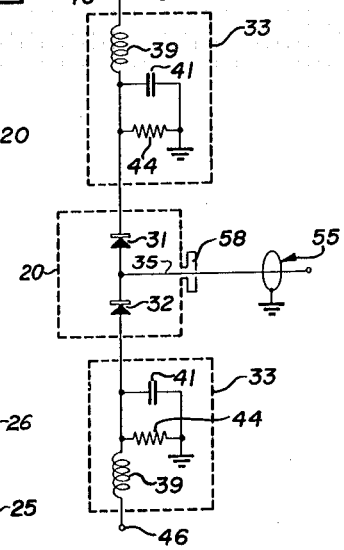
Fig. 4
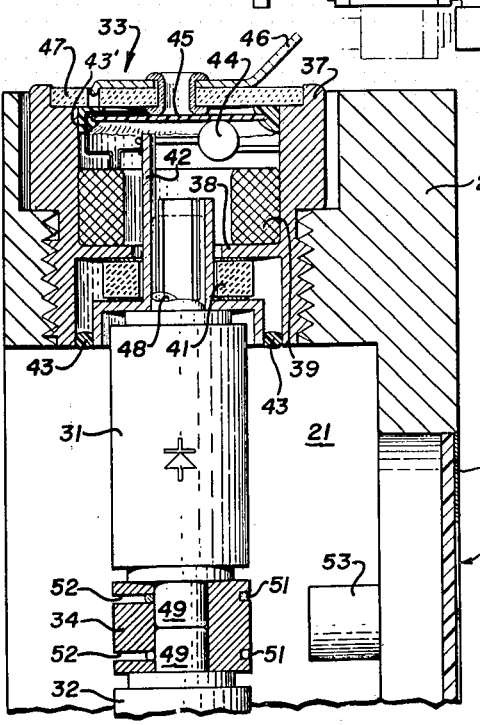
Fig. 6
INVENTOR.
Richard M. Whitehorn
BY
*Paul B. Hunter*
Attorney Nov. 27, 1962 R. M. WHITEHORN 3,066,290
WAVEGUIDE HYBRID JUNCTIONS
Filed Dec. 28, 1959 2 Sheets-Sheet 2

INVENTOR.
Richard M. Whitehorn
BY
Paul B. Hunter
Attorney

United States Patent Office 3,066,290
Patented Nov. 27, 1962

3,066,290
WAVEGUIDE HYBRID JUNCTIONS
Richard M. Whitehorn, Menlo Park, Calif., assignor to Varian Associates, Palo Alto, Calif., a corporation of California
Filed Dec. 28, 1959, Ser. No. 862,356
31 Claims. (Cl. 343—100)

This invention relates, in general, to microwave circuit components, and, more particularly, to microwave hybrid junctions (embodying such devices as power dividers, directional couplers, bridges, duplexers, diplexers, mixers, modulators and parametric devices) and waveguide assemblies utilizing such junctions.

One particularly significant limitation in the practical utility of microwave hybrid junctions heretofore available, for example magic-T and short-slot junctions, is the fact that the structural configurations of such junctions are quite bulky. Thus, they are unsuited for use in applications where microwave units of minimum size and weight are desired and further they are not adaptable to simple, inexpensive manufacturing techniques.

It is the principal object of the present invention to provide novel methods and apparatus enabling the construction of extremely compact and light-weight hybrid junctions, said junctions possessing frequency insensitive balanced properties and being simple and inexpensive to manufacture.

One feature of the present invention is the provision of a microwave hybrid junction capable of dividing the power of two waves and combining same in a frequency insensitive, balanced manner, wherein two orthogonal, axially propagating, dominant electric modes are established in a hollow waveguide, one corresponding to each wave, and said modes are perturbed so that the electric fields of said modes are asymmetrical about all equipotentials of one mode but symmetrical about an equipotential of the other mode.

Another feature of the present invention is the provision of a waveguide junction according to the previous paragraph wherein a collinearly disposed pair of diode means is interiorly inserted to provide a balanced beat frequency connection.

A further feature of the present invention is the provision of a microwave mixer in accordance with the previous paragraph which is adapted to receive a signal wave polarized in a given direction at one end of said waveguide and a local oscillator wave polarized perpendicularly to said given direction at the opposite end thereof.

Still another feature of the present invention is the provision of a rectangular, broadband microwave mixer constructed in accordance with the preceding paragraph.

Another feature of the present invention is the provision of a mixer assembly comprising a mixer in accordance with the preceding paragraph in combination with a crystal protector tube secured at said one end of said waveguide and a reflex klystron oscillator secured at said opposite end thereof.

Another feature of the present invention is the provision of a mixer-duplexer constructed in accordance with the third preceding paragraph.

Another feature of the present invention is the provision of a mixer-duplexer assembly comprising a mixer-duplexer in accordance with the preceding paragraph in combination with an antenna secured at said one end thereof and a reflex klystron oscillator secured at said opposite end thereof.

Figure 8:
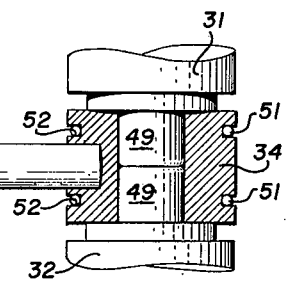
Figure 8:
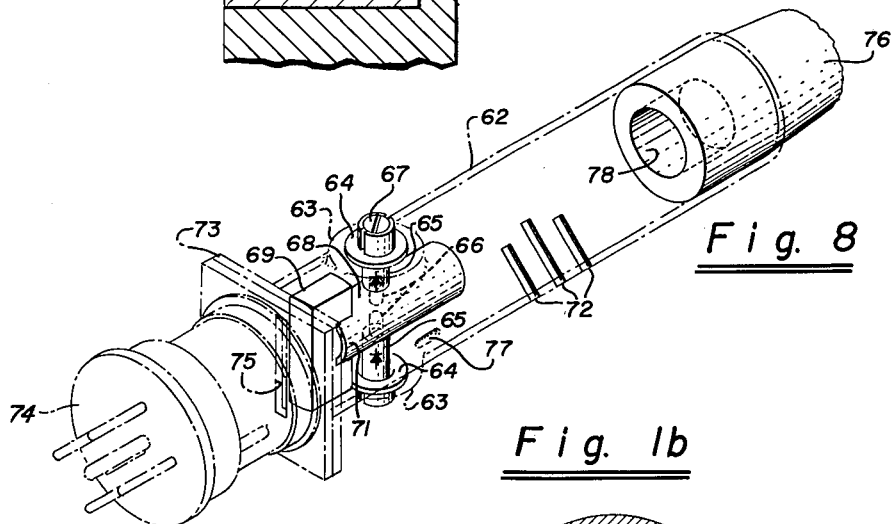
Figure 1B:
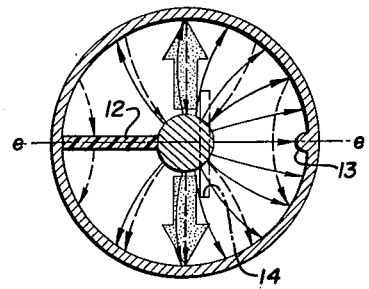
Figure 1A:
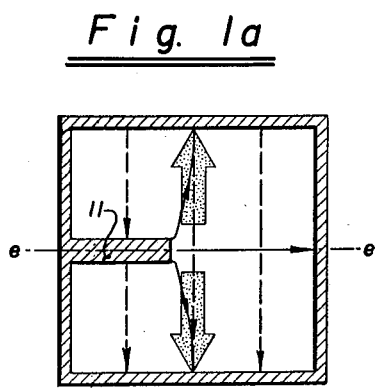

These and other features and advantages of the present invention will be more apparent upon a perusual of the following specification taken in connection with the accompanying drawings, wherein FIGS. 1a and 1b are schematic diagrams of the electric fields and directional connections in typical cross sections of junctions made in accordance with the present invention, FIG. 2 is an isometric view of a microwave mixer constructed in accordance with the present invention, FIG. 3 is a rear view of the mixer of FIG. 2, FIG. 4 is a cross-sectional view taken through a crystal cap assembly in the mixer of FIG. 2, FIG. 5 is a cross-sectional view taken through the I.F. contact assembly in the mixer of FIG. 2, FIG. 6 is a schematic diagram of the crystal current circuit in the mixer of FIG. 2, FIG. 7 is a top view of the mixer of FIG. 2 shown in combination with a local oscillator and a crystal protector tube, and FIG. 8 is an isometric view of a mixer-duplexer constructed in accordance with the present invention.

The basic method of the present invention consists in the establishment of two orthogonal, axially propagating, dominant transverse electric modes in a waveguide capable of supporting such modes, and perturbing said modes so that the electric fields of both modes are asymmetrical about all equipotentials of one mode but symmetrical about an equipotential of the other mode. This is illustrated in FIGURES 1a and 1b which show the electric field configurations in typical junction cross sections. The solid lines represent the electric field of the asymmetrical mode, there being no equipotential of that mode about which all field lines are symmetrical. The dashed lines represent the electric field of the unperturbed symmetrical mode, all field lines being symmetrical about the equipotential $e$—$e$ of that mode.

Several different means of introducing a suitable perturbation for establishing an asymmetrical mode are illustrated by FIGURES 1a and 1b. In FIGURE 1a a metallic projection 11, such as a partial septum or post, projects inwardly from the wall of a prismatic waveguide. In FIGURE 1b a dissipative fin 12 is inserted normal to the inner and outer conductors in a coaxial waveguide section and/or an inwardly extending projection 13 is provided in the outer conductor. The metallic projections are provided in a region where high field strengths are desired and the dissipative fin is provided in a region where low field strength is desired. The asymmetrical mode in FIGURE 1b may be considered a mixture of symmetrical $TE_{11}$ and TEM modes. Still another way, either additional or alternative, of establishing such a mixed mode in a coaxial waveguide is to excite the guide from an asymmetrical junction as, for example, by closing one end of the outer conductor with the flange of a horizontally polarized klystron source such that the vertically extending output aperture 14 in the flange is disposed to the right of the center line of the guide thereby establishing a higher field strength in that half of the guide. In addition, moderate asymmetrical reflections from irregularities in the waveguide and moderate dissimilarities in detecting components inserted in the waveguide may be compensated by appropriate translation and/or rotation of the aperture 14. Many other suitable means for establishing an asymmetrical orthogonal mode will become apparent to the skilled in the art in view of the present disclosure.

When the waveguide modes are established in accordance with the present invention there will exist two extensive field regions of particular importance. In the first region a directional component of the electric field of one mode will be in-phase with the corresponding directional component of the other mode at a time when other corresponding directional components of these modes are out-of-phase in the second region. If a waveguide connection which is sensitive to the fields in a single direction is made in each of the above field regions, one connection will then be responsive to the sum of the amplitudes of the orthogonal modes whereas the other connection will be responsive to the difference of the amplitudes, thereby providing an extremely compact, frequency insensitive, balanced junction. Typical patterns of connection are illustrated by the large speckled arrows in FIGURES 1a and 1b, the fields being out-of-phase in the direction of the upper arrow and in-phase in the direction of the lower arrow. Various means can be used for providing suitable connections including, for example, a single mode waveguide responsive only to the electric field direction indicated; or a crystal rectifier, capacitor, absorber or other device inserted in the waveguide and acted upon only by electric fields (and/or concomitant magnetic fields) of the orientation indicated.

It will be convenient at this point to mention two particular advantages of the present invention which can best be understood by reference to FIGURES 1a and 1b. In many instances the waveguide connection means can be located entirely in the interior of the waveguide. For example, two crystal rectifiers aligned with the large speckled arrows would themselves constitute the connections. Thus, the power dividing and signal coupling functions are performed within the same compact physical space. Secondly, it is to be noted that the field configuration in the junctions of the present invention permit the use of collinear connections. Thus, the connections may be properly positioned symmetrically about the perturbing means (such as 11, 12 and 13) by simple machining operations, and impedance matching is simply effected by suitably locating the center line of the connections along a single perpendicular reference direction (such as e—e).

Consider, now, the case wherein the dashed lines represent the electric field of a signal wave, the solid lines represent the electric field of an orthogonally established local oscillator wave, and the output connections consist of crystal rectifiers or similar non-linear components oriented in the direction of the large arrows. Since the relative phases between the local oscillator wave and the signal wave in the separate crystals are reversed, the beat frequency (difference of the signal carrier and local oscillator frequencies) component of the current in the separate crystals are out-of-phase. The relative phases between the local oscillator wave and the noise due to local oscillator fluctuations, however, are the same in each crystal. Thus, if the polarity of the crystals and the output connections are arranged so that the signals due to the currents in the separate crystals are subtracted, the local oscillator noise is effectively cancelled and the beat frequency signal is transmitted, thereby providing a frequency insensitive balanced mixer. Two particularly useful embodiments of such a mixer are described by reference to FIGURES 2 and 8 as practical examples of the present invention.

FIGURE 2 shows a mixer particularly useful in applications requiring a sensitive broadband unit of minimum size and weight; for example, in airborne microwave receivers where difficult packaging problems are encountered. The basic structural element of this embodiment is a rectangular metallic block 20 having a rectangular recess 21 extending through the front surface thereof and forming an electrically short (and hence broadband) rectangular waveguide. Such a structure may be quite simply provided by applying a square hole drill to a solid metallic block, or by the use of a suitably shaped die. As best seen in FIGURE 3, a vertical coupling aperture 22 is cut through the surface of a shallow slot 24 milled into the rear surface of the block 20. Inserted in the slot 24 is a fiberglass attenuator card 25 coated on the right end thereof with a thin metallic film 26 (speckled area) providing a V-shaped boundary midway of the card 25. Card 25 is slidably moved by inserting a rod in the narrow ends of the slot 24, thereby varying the effective coupling of aperture 22. Card 25 remains securely positioned after such adjustment by means of rubber friction pads 28.

Positioned interior to the block 20 is a matched pair of crystal rectifiers 31 and 32 arranged in polarity (as shown by the arrows thereon) so that the currents therein subtract at cylindrical junction block 34 supporting the interior end of each crystal. The difference in the crystal currents is then externally conducted along the metallic post 35, which is soldered into a small hole drilled in block 34 and extends through the left surface of block 20 in insulated relation therewith.

A plurality of screw holes 36 extend into the front and rear surfaces of block 20 in order to accommodate means for supplying a vertically polarized signal wave at the front surface of the block, and a local oscillator providing a horizontally polarized wave through coupling aperture 22 at the rear surface of the block. The signal wave is undisturbed by the post 35 and constitutes a symmetrical mode providing electric fields of the same direction in crystals 31 and 32. The local oscillator waves are perturbed by the post 35 and constitute an asymmetrical orthogonal mode providing electric fields in opposite directions at crystals 31 and 32. Thus, the field configuration is similar to that shown in FIGURE 1a where projection 11 represents the post 35. Since the current in post 35 is the difference of the two crystal currents, a balanced I.F. beat frequency signal is obtained thereat, in a manner previously discussed.

Referring to FIGURE 4, the crystals 31, 32 are removably mounted in a cap structure 33 comprising an outer sleeve member 37 threaded y inserted in the top surface of the block 20, and electrically grounded through contact with said block. Sleeve 37 has an inwardly extending, annular shoulder 38 above which is mounted an insulated wire coil 39. An annular, silver-plated ceramic capacitor 41 secured below shoulder 38 supports a contact sleeve 42 in insulated relation with respect to outer sleeve 37. Additional support and insulation is provided by a ring-shaped cement seal 43 across which microwave frequency fields are by-passed. A cylindrical resistor 44 is connected between an outwardly extending projection of sleeve 42 and outer sleeve 37. A thin mica insulating sheet 45, secured by cement seal 43' to the inside surface of sleeve 37, prevents the leads of resistor 44 from contacting the output terminal lug 46 which is insulated from the sleeve 37 by ceramic disc 47. Coil 39 is connected between the outward projection of sleeve 42 and lug 46 through the cement seal 43'. The outwardly projecting pin 48 of each crystal is tightly engaged by the spring contact fingers of contact sleeve 42. The inwardly projecting pins 49 extend axially through three-terminal junction block 34 and are held in good electrical contact therewith by means of two D-shaped springs 51 seated in eccentric grooves 52. A small cylindrical stub 53 placed adjacent the outer edge of coupling aperture 22 aids in coupling the local oscillator wave to crystals 31, 32.

Referring, now, to FIGURE 5, the post 35 is soldered into a recess in block 34 and extends through the left wall of block 20 to form the inner conductor 54 of a coaxial connector 55 into which is screwed the input lead (not shown) of the subsequent I.F. circuitry. The outer conductor of coaxial connector 55 is an inwardly threaded ring 56 seated in and electrically contacting a bushing 57 extending through the wall of block 20. Post 35 is insulated from the conductor 57 by means of a ceramic choke 58 cemented to the interior surfaces thereof. The transmission structure formed by conductors 35 and 57 consists of a low-characteristic-impedance quarter-wave coaxial section $a$ and a high-characteristic-impedance antiresonant pillbox section $b$. The combination of these two sections provides a broadband by-pass to ground for the high signal carrier and local oscillator frequencies while transmitting the lower I.F. frequency signal. This transmission structure has the further advantage that it does not introduce large shunt capacity which would tend to narrow the response of the subsequent I.F. circuitry.

The operation of the mixer of FIGURE 2 will be summarized by reference to the schematic circuit diagram of FIGURE 6. The D.C. current in the crystals 31 and 32 is monitored by means of the voltage appearing at terminals 46 thus providing a check on the coupling of energy from the local oscillator to the crystals and permitting the attenuator card 25 to be positioned so that the current is within a range of optimum crystal performance. A.C. crystal current components which would produce undesirable leakage fields are filtered from terminals 46 by means of a network comprising the series inductance 39 and shunt capacitor 41. Resistors 44 provide a D.C. path to ground across which is established the current measuring voltage applied to terminals 46. The value of resistors 44 is chosen to establish a minimum bias across the crystals 31, 32 consistent with the requirements of the voltage measuring instrument. In an exemplary embodiment, resistor 44 is 22 ohms and the D.C. crystal current is maintained in the range of 0.5 to 1.0 milliampere. The subtraction of the crystal currents at the junction of conductor 35 eliminates local oscillator fluctuation noise, and the high frequency components of the local oscillator and signal waves are by-passed through choke 58, thereby presenting a pure beat frequency signal at output connector 55.

FIGURE 7 shows the mixer of FIGURE 2 in combination with a reflex klystron local oscillator 60, and a crystal protector tube 61 through which the signal energy passes. In an exemplary embodiment using a matched pair of 1N23 WEMR crystal rectifiers and covering the entire range from 8.5 to 9.6 kmc. without adjustment, the crystal protector tube 61 is model BL-S-504 manufactured by Bomac Laboratories Inc. of Beverly, Massachusetts, and the reflex klystron 60 is model VA-217 manufactured by Varian Associates of Palo Alto, California. The mixer alone has dimensions of only ¾" x 1⅝" x 1⅝" and weighs only 6.5 ounces using brass as the waveguide material, and the entire assembly of FIGURE 7 has dimensions of 2¹³⁄₁₆" x 2½" x 1⅝" and weighs 14 ounces. This embodiment has a measured noise figure of less than 10 db (including 3 db of 30 mc. I.F. noise and the image frequency contribution) and provides a sensitivity heretofore available only with units of substantially greater size and weight.

FIGURE 8 shows a compact and rugged mixer-duplexer embodiment of the present invention useful, for example, in the detection of moving objects as in a traffic control unit. A cylindrical waveguide 62 (shown as transparent for clarity of description) has two diametrically opposed raised flat portions 63 through which are inserted a pair of crystal rectifiers 65 of the type having a pin termination 66 at one end thereof and a cartridge termination 67 at the opposite end. Cartridges 67 are held by a pair of hat connectors 64 glued to the raised portions 63 of waveguide 62 so as to be insulated therefrom and provide a high frequency by-pass to the grounded conductor 62. Pins 66 extend through and contact an inner cylindrical conductor 68. Inner conductor 68 is soldered to a metallic bar 69 forming a vertical septum and the bar 69 is, in turn, soldered to the outer conductor 62. Three metallic pins 72 extend radially inward at an angle of 45° with respect to the vertical to form a quarter-wave plate in the waveguide 62. The left end of the waveguide 62 is terminated in a flange 73 adapted to mate to the flange of a stable reflex klystron oscillator 74 which provides a horizontally polarized wave through the vertically extending output aperture 75. A suitable klystron for this purpose is model VA-204 manufactured by Varian Associates of Palo Alto, California, operating at a typical frequency of 10.250 kmc. The front end of the cylinder 62 is closed off by the forced insertion of a tapered, cylindrical, polyrod directional antenna 76 (only a fragment of which is shown in FIGURE 8) providing a simple water-tight seal thereat.

The conductor 62 is quite simply constructed by applying die rubber under pressure to a smooth cylindrical tube, thereby forming raised portions 63 and drill hole marks for the insertion of crystals 65 and quarter-wave plate pins 72. After the above described unit is completely assembled, a small dent 77 is pressed into the wall of the waveguide 62 at a position in the same transverse plane as the center lines of crystals 65 which is equally distant from each crystal. Thus, dent 77 is analogous to projection 13 in FIGURE 1b and constitutes a means for introducing suitable asymmetry with respect to a horizontally polarized mode in the coaxial waveguide section between conductors 62 and 68. A small cylindrical cavity 78 formed by simply drilling a hole in the end of the antenna 76 provides a convenient quarter-wave impedance transformer for matching the antenna 76 to the waveguide 62. This transformer eliminates the need for placing additional obstructions inside the waveguide and enhances the mode stability thereof.

In operation, the horizontally polarized wave from the transmitting local oscillator 74 passes the vertical septum 69 without disturbance. Dent 77 introduces a small asymmetry so that a small fraction of the transmitted power is coupled to the crystals 65, the electric field being of opposite direction in each crystal as indicated by the solid line mode of FIGURE 1b. The transmitted wave then proceeds to the quarter-wave plate 72 and is transformed into a right hand circularly polarized wave which is then radiated by antenna 76. The reflected waves are received by antenna 76 and propagated into waveguide 62 as left hand circularly polarized waves. Quarter-wave plate 72 transforms these received waves into a vertically polarized mode similar in configuration to the dashed lines of FIGURE 1b. If a 45° Faraday rotator is substituted for quarter-wave plate 72, the operation to this point is essentially the same except that the transmitted and received waves will be plane polarized. The vertical isolating septum 69 corrects inaccuracies in the polarization of the transmitted wave by reflecting any vertical component thereof, and prevents transmission of the vertically polarized received wave to the oscillator 74 so that substantially all the received energy is absorbed by the crystals 65. Hat connectors 67 are connected to a common junction to provide a signal corresponding to the difference in the crystal currents. Since the received electric fields are in the same direction at each crystal 65, this signal will have a beat frequency equal to the difference in frequency between the transmitted and reflected waves and an amplitude containing reflected wave fluctuations but not transmitted wave fluctuations. Thus, for example, the frequency of the signal yields information as to the speed of a reflecting vehicle target and the amplitude of the signal yields information as to the nature and location of the vehicle.

For the sake of convenience, the terms "horizontal," "vertical," "top," "bottom," etc., are used in the specification and claims in a relative sense only, it being apparent that devices in accordance with the present invention may be used in any desired orientation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Method of combining two electromagnetic waves in a hybrid junction which comprises the steps of establishing two orthogonal, axially propagating, dominant transverse electric modes in a single waveguide, one corresponding to each wave, and perturbing said modes so that the electric fields of said modes are asymmetrical about all equipotentials of one mode but symmetrical about an equipotential of the other mode.

2. The method of claim 1 further including the step of coupling energy at two waveguide regions, the electric fields of the modes being in-phase in one region when out-of-phase in the other region.

3. A waveguide hybrid junction comprising a waveguide adapted to support two orthogonal, axially propagating, dominant transverse electric modes, a pair of connections directionally responsive to the electric field of said modes, and means for distorting said modes to produce electric fields of opposite direction in each connection with one mode and electric fields of the same direction in each connection with the other mode.

4. A waveguide hybrid junction according to claim 3 wherein said connections are collinearly disposed.

5. A microwave mixer comprising a waveguide adapted to support two orthogonal, axially propagating, dominant transverse electric modes, a pair of crystal rectifiers collinearly disposed and extending inwardly of said waveguide, means for perturbing the electric fields in said waveguide to establish electric fields of opposite direction in each crystal rectifier with one mode and electric fields of the same direction in each crystal rectifier with the other mode, and means for combining the signals in said crystal rectifiers to produce a balanced beat frequency output.

6. A microwave mixer comprising a hollow waveguide capable of propagating in two orthogonal modes, a pair of crystal rectifiers collinearly extending inwardly from the walls of said waveguide in a given direction, means at one end of said waveguide for accommodating signal waves polarized in said given direction, means at the opposite end of said waveguide for accommodating local oscillator waves polarized perpendicularly to said given direction, a metallic projection extending inwardly from said waveguide wall midway of said crystal rectifiers and perturbing said local oscillator waves to establish electric fields of opposite direction in each crystal rectifier, and means for combining the signals of said rectifiers to provide a balanced beat frequency output.

7. A microwave mixer comprising a metallic block having recessed therein a rectangular waveguide, said waveguide being adapted to propagate vertically polarized signal waves entering through the front surface of said block and horizontally polarized local oscillator waves entering through the rear surface of said block, a pair of collinearly disposed crystal rectifiers extending inwardly through the top and bottom surfaces of said block, junction means supporting the interior terminals of said crystal rectifiers in electrical contacting relation, the polarity of said crystals being arranged so that said junction means receives the difference of the current in each crystal rectifier, and a metallic post extending from said junction means through a side surface of said block, said post being insulated from said block and forming a balanced beat frequency output conductor.

8. A microwave mixer according to claim 7 wherein said post is insulated from said block by means of a low shunt capacitance choke, said choke being shaped to successively establish a low-characteristic-impedance quarter-wave coaxial section and a high-characteristic-impedance antiresonant pillbox section between said post and said block, thereby providing a broadband by-pass for the high frequency components of the signal and local oscillator waves.

9. A microwave mixer according to claim 7 further comprising a pair of external monitoring terminals, and circuit means connected between the exterior terminals of said crystal rectifiers and said monitoring terminals for filtering alternating crystal current components and applying a voltage to said terminals which is proportional to the direct current in said crystal rectifiers.

10. A microwave mixer according to claim 9 further comprising a pair of cap assemblies supporting the exterior terminals of said crystal rectifiers, said external monitoring terminals being mounted exterior to said cap assemblies and said circuit means being mounted interior to said cap assemblies.

11. A microwave mixer according to claim 7 further comprising a vertically extending local oscillator coupling aperture through the rear face of said block, and means positioned at said aperture for attenuating said local oscillator waves.

12. The combination of claim 11 further comprising a crystal protector tube secured to the front surface of said block and a reflex klystron local oscillator secured to the rear surface of said block.

13. A waveguide hybrid junction according to claim 3 wherein each of said connections includes a diode means.

14. The mixer of claim 5 wherein said perturbing means comprises a structure projecting along the perpendicular bisector of the common axis of said crystal rectifiers, transverse to the axis of said waveguide.

15. The mixer of claim 14 wherein said perturbing structure comprises a metallic projection extending inwardly from the wall of said waveguide.

16. The combination of claim 6 further comprising a crystal protector tube secured to said one end of said waveguide and a reflex klystron local oscillator secured to said opposite end thereof.

17. A mixer-duplexer assembly comprising a hollow waveguide adapted to forwardly propagate a transmitted wave polarized perpendicularly to a given direction and rearwardly propagate a received wave polarized in said given direction, a pair of crystal rectifiers collinearly disposed in said given direction and extending inwardly of said waveguide, means for perturbing the electric fields in said waveguide to establish electric fields of opposite direction in each crystal rectifier with one mode and fields of the same direction in each crystal rectifier with the other mode, and means for combining the signals in said crystal rectifiers to produce a balanced beat frequency output.

18. The assembly of claim 17 further including a septum positioned rearward of said crystal rectifiers for isolating waves polarized in said given direction, and means positioned forward of said crystal rectifiers for transforming the polarization of said transmitted and received waves.

19. A mixer-duplexer assembly according to claim 18 further including an antenna secured to the forward end of said waveguide and a reflex klystron source secured to the rear end thereof.

20. A waveguide hybrid junction according to claim 3 including an elongated aperture means communicating with the interior of said waveguide for coupling energy from a microwave source positioned closely adjacent the exterior of said waveguide to establish one of said waveguide modes.

21. A waveguide hybrid junction according to claim 20 further including means positioned at said aperture means for attenuating the microwave source energy coupled thereby.

22. A waveguide hybrid junction according to claim 21 wherein said attenuating means is slideably mounted relative to said aperture means for varying the attenuation of said source energy.

23. A microwave mixer according to claim 5 further comprising a pair of contact sleeves for receiving the exterior terminals of said crystal rectifiers, said sleeves being coaxially spaced with respect to passageways through said waveguide, and insulating means between said sleeves and said passageways across which microwave frequency fields are by-passed.

24. A mixer-duplexer comprising a cylindrical waveguide adapted to forwardly propagate a horizontally polarized transmitted wave and rearwardly propagate a vertically polarized received wave, a vertical septum extending diametrically across the interior of said waveguide at the rear end thereof to isolate vertically polarized waves, a cylindrical inner conductor extending forward from said septum and establishing a coaxial waveguide section, a pair of collinear crystal rectifiers extending radially inward through said cylindrical waveguide in insulated relation therewith and contacting said inner conductor with the inner terminals thereof, said crystal rectifiers being vertically disposed so that the electric field of a received wave extends to each crystal rectifier in the same direction, the wall of said cylindrical waveguide having a small indentation therein midway of said crystal rectifier to direct a fraction of the electric field of a transmitted wave to said crystal rectifiers in opposite directions, and terminal means at the outward end of each crystal rectifier for providing a balanced beat frequency signal corresponding to the difference of current in each crystal rectifier.

25. A mixer-duplexer according to claim 24 wherein the wall of said cylindrical waveguide has two diametrically opposed raised flat portions therein, a pair of hat connectors are insulatedly secured to said flat portions, and the outward ends of said crystal rectifiers are supported in said hat connectors.

26. The combination of claim 24 further comprising a reflex klystron transmitting oscillator secured to the rear end of said waveguide and providing horizontally polarized waves, a quarter-wave plate positioned forward of said coaxial section and transforming said horizontally polarized waves into circularly polarized waves of one sense, a polyrod directional antenna tightly inserted in the forward end of said cylindrical waveguide for radiating said circularly polarized waves and receiving back reflected waves which are circularly polarized in the opposite sense, said received circularly polarized waves being transformed to vertically polarized waves by said quarter-wave plate.

27. The combination of claim 26 wherein an axially extending cavity is provided through the rear surface of said polyrod antenna, said cavity providing a quarter-wave impedance transformer for matching said antenna to said cylindrical waveguide.

28. A waveguide hybrid junction comprising: a waveguide structure surrounding a junction region; a three-terminal conductive junction disposed in said region; a single pair of diode connections directionally responsive to high frequency fields in said region, said diode connections having terminals of opposite polarity conductively connected together through two terminals of said conductive junction; a conducting member conductively connected to the third terminal of said junction and extending externally of said region; waveguide coupling means conductively isolated from said junction and communicating with said junction region for coupling a high frequency field of a first frequency with said diode connections, said field extending in the same sense along the responsive direction of each diode connection; and waveguide coupling means conductively isolated from said conductive junction and communicating with said junction region for coupling a high frequency field of a second frequency with said diode connections, said field extending in an opposite sense along the responsive direction of each connection whereby the conducting member connected to the third terminal of said conductive junction supports current at a beat frequency of said first and second frequencies.

29. A waveguide hybrid junction according to claim 28 wherein the conducting member connected to the third terminal of said conductive junction extends through said waveguide structure and is insulated therefrom by means of a low shunt capacitance choke, said choke being shaped to successively establish a low-characteristic-impedance quarter-wave coaxial section and a high-characteristic-impedance antiresonant pillbox section between said conducting member and said waveguide structure, thereby providing a broadband by-pass for said first and second high frequencies.

30. A waveguide hybrid junction according to claim 28 wherein said means for coupling said first frequency field comprises means for establishing a dominant transverse electric mode in said waveguide structure at said first frequency which is polarized perpendicularly to the conducting member connected to the third terminal of said conductive junction, said conducting member extending transversely through said waveguide structure in insulated relation therewith; and said means for coupling said second frequency field comprises means for establishing a dominant transverse electric mode in said waveguide structure at said second frequency, the polarization of said second frequency mode being perpendicular to that of said first frequency mode.

31. A waveguide hybrid junction according to claim 30 wherein said junction connections are collinearly disposed in the polarization direction of said first frequency mode.

References Cited in the file of this patent

UNITED STATES PATENTS

| | | |
|---|---|---|
| 2,429,243 | Snow et al. | Oct. 21, 1947 |
| 2,527,910 | Braden | Oct. 31, 1950 |
| 2,576,481 | Rodwin | Nov. 27, 1951 |
| 2,666,134 | Dicke | Jan. 12, 1954 |
| 2,754,416 | Hope | July 10, 1956 |
| 2,761,061 | Mattern | Aug. 28, 1956 |
| 2,790,073 | Curtis | Apr. 23, 1957 |
| 2,813,972 | Anderson et al. | Nov. 19, 1957 |
| 2,850,626 | Tomiyasu | Sept. 2, 1958 |